United States Patent [19]
Morita

[11] Patent Number: 5,592,064
[45] Date of Patent: Jan. 7, 1997

[54] BATTERY CHARGING APPARATUS, POWER SUPPLY, AND ATTACHMENT FOR CONNECTING DIFFERENT TYPES OF BATTERY PACKS TO A BATTERY CHARGER

[75] Inventor: Hideyo Morita, Sumoto, Japan

[73] Assignee: Sanyo Electric Co., Ltd., Osaka, Japan

[21] Appl. No.: 155,197

[22] Filed: Nov. 22, 1993

[30] Foreign Application Priority Data

Nov. 26, 1992 [JP] Japan ................................. 4-081824 U
Feb. 4, 1993 [JP] Japan ..................................... 5-017483

[51] Int. Cl.[6] ................................................. H01M 10/46
[52] U.S. Cl. ............................................................. 320/2
[58] Field of Search ............................. 320/2, 5; 429/96, 429/97, 98, 99, 100; D13/103, 107, 108

[56] References Cited

U.S. PATENT DOCUMENTS 5,280,229 1/1994 Faude et al. .................................. 320/2
5,306,576 4/1994 Sasaki ......................................... 429/98
5,355,072 10/1994 Satsuma et al. ........................... 320/13

FOREIGN PATENT DOCUMENTS

4-183232 6/1992 Japan .

*Primary Examiner*—Edward H. Tso
*Attorney, Agent, or Firm*—Wenderoth, Lind & Ponack

[57] ABSTRACT

A charging attachment connects battery packs having different cell types with a battery charger, and a power source attachment connects these battery packs to electrical equipment such as a video camera. The charging attachment has a mount for a constant voltage chargeable battery pack and electrically connects it with constant voltage adapter terminals on a battery charger. The power source attachment has easy on-off coupling with electrical equipment and mounts a reduced size battery pack on equipment designed for full size battery packs. The charging and power source attachments can be single unit.

18 Claims, 9 Drawing Sheets

BATTERY CHARGING APPARATUS, POWER SUPPLY, AND ATTACHMENT FOR CONNECTING DIFFERENT TYPES OF BATTERY PACKS TO A BATTERY CHARGER

BACKGROUND OF THE INVENTION

This invention relates to a battery charging apparatus, a power supply, and an attachment allowing the charging of both constant voltage rechargeable batteries and constant current rechargeable batteries, and allowing different shaped rechargeable batteries to be accomodated.

There are different types of rechargeable batteries that can be used repeatedly after charging. Alkali rechargeable batteries such as nickel-cadmium and nickel-hydrogen batteries are already in widespread use. Nonaqueous rechargeable batteries such as lithium ion batteries, which are small and have a high capacity, have recently gained attention.

Alkali rechargeable batteries have the property that the battery voltage increases during charging and then decreases when a full charge is reached. Therefore, alkali rechargeable batteries are normally charged with a constant current using a battery charger having a constant current output terminals.

On the other hand, nonaqueous rechargeable batteries such as lithium ion batteries behave in a manner that does not allow constant current charging. Since nonaqueous battery voltage continues to increase with constant current charging even after reaching a full charge, full charge cannot be detected by sensing the battery voltage and over-charging results. Consequently, nonaqueous :rechargeable batteries are charged with a constant voltage as described by Japanese Patent Disclosure Hei 4-183232 (1992).

Since alkali rechargeable batteries and nonaqueous rechargeable batteries have different charging methods, it is necessary to charge them with a constant current and constant voltage respectively.

Further, a battery pack housing nonaqueous rechargeable batteries is smaller than that housing alkali rechargeable batteries. This is because nonaqueous rechargeable batteries are smaller and have a higher power capacity as compared to alkali rechargeable batteries. Consequently, a nonaqueous rechargeable battery pack has a different shape than an alkali rechargeable battery pack and cannot be attached as is to electrical equipment designed for alkali rechargeable battery pack specifications.

It is thus the primary object of the present invention to provide a single battery charging apparatus that can charge both alkali and nonaqueous rechargeable batteries using charging terminals to output a constant current and adapter terminals to output a constant voltage.

It is yet another object of the present invention to provide an apparatus that makes it possible to attach rechargeable batteries of different shapes to electrical equipment.

SUMMARY OF THE INVENTION

The attachment or this invention comprises an attachment for mating a battery pack which houses battery cells charged by a constant voltage charging, with a battery charger; comprising: charging terminals for a constant current output and adapter terminals at constant voltage output; a battery mount for freely mounting or removing the battery pack; connecting terminals for electrical connection with said adapter terminals; and charging contacts for electrical connection with battery terminals of the battery pack mounted in said battery mount and with electrical connection to said connecting terminals.

The battery charging apparatus of this invention comprises: a battery charging apparatus comprising: an attachment for mating a first battery pack which houses battery cells charged by a constant voltage charging, with a battery charger provided with charging terminals for a constant current output and adapter terminals for a constant voltage output; wherein said battery charger comprises a mounting section for direct connection of a second battery pack, which houses battery cells charged by a constant current charging, and said mounting section electrically connects said charging terminals with battery terminals of said second battery pack mounted in said mounting section; and said attachment comprising: a battery mounted for freely mounting or removing the first battery pack; connecting terminals for electrical connection with said adapter terminals; and charging contacts for electrical connection with battery terminals of the first battery pack mounted in said battery mount and with electrical connection to said connecting terminals.

DETAILED DESCRIPTION OF THE INVENTION

The apparatus of the present invention can charge battery packs with different external shapes and different internal battery cell types. Battery packs containing alkali rechargeable batteries mount directly on the battery charger and are charged with a constant current by connection to charging terminals. Battery packs containing nonaqueous rechargeable batteries are mounted on the battery charger via the attachment. The battery pack connects to the adapter terminals of the battery charger through the attachment to charge the nonaqueous rechargeable batteries to constant voltage.

The attachment of this invention is also provided with a coupling section that allows a charged battery pack to mount on electrical equipment via the attachment.

Figure 1:
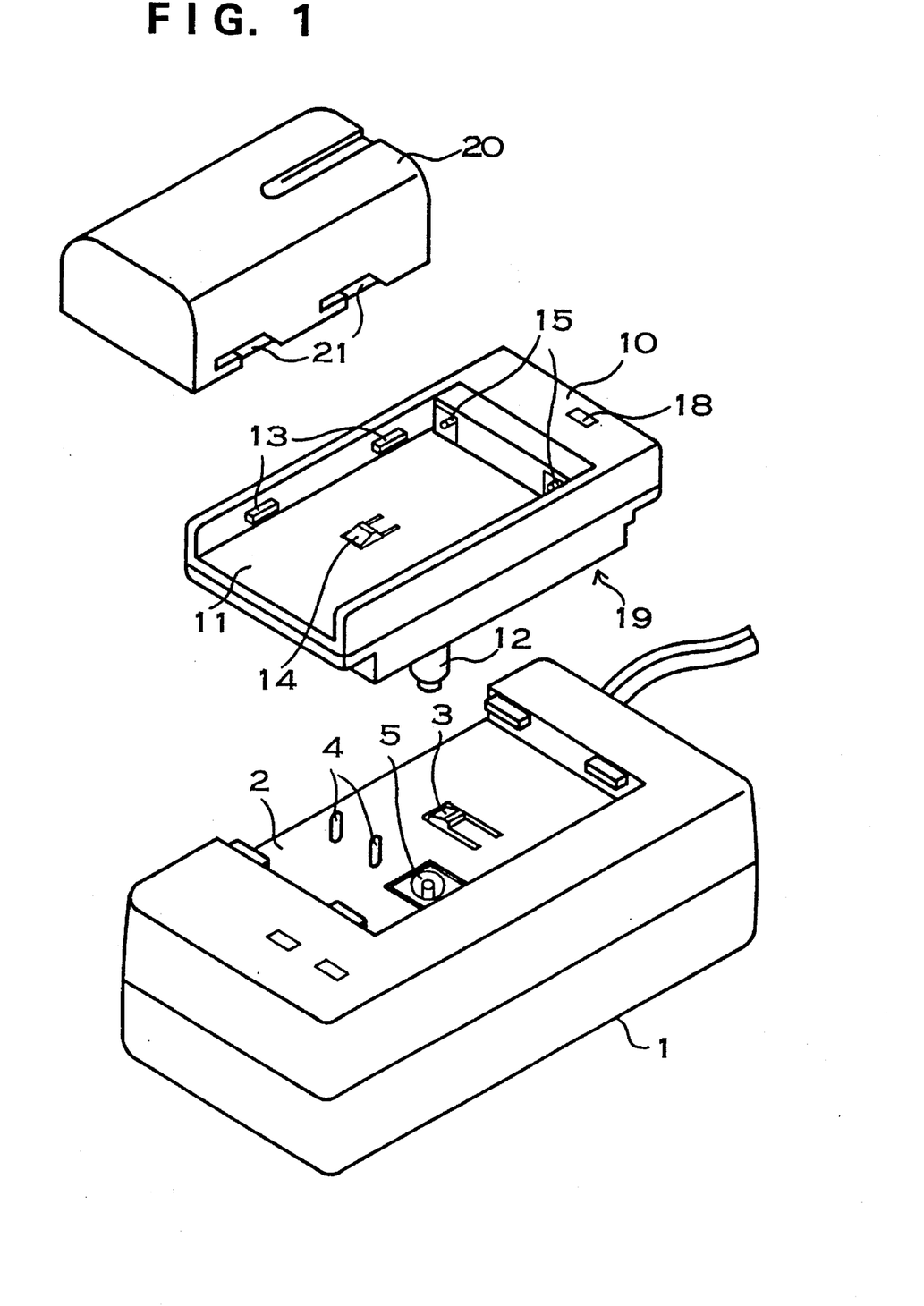
FIG. 1 is an oblique view showing an embodiment of the present invention.
Figure 2:
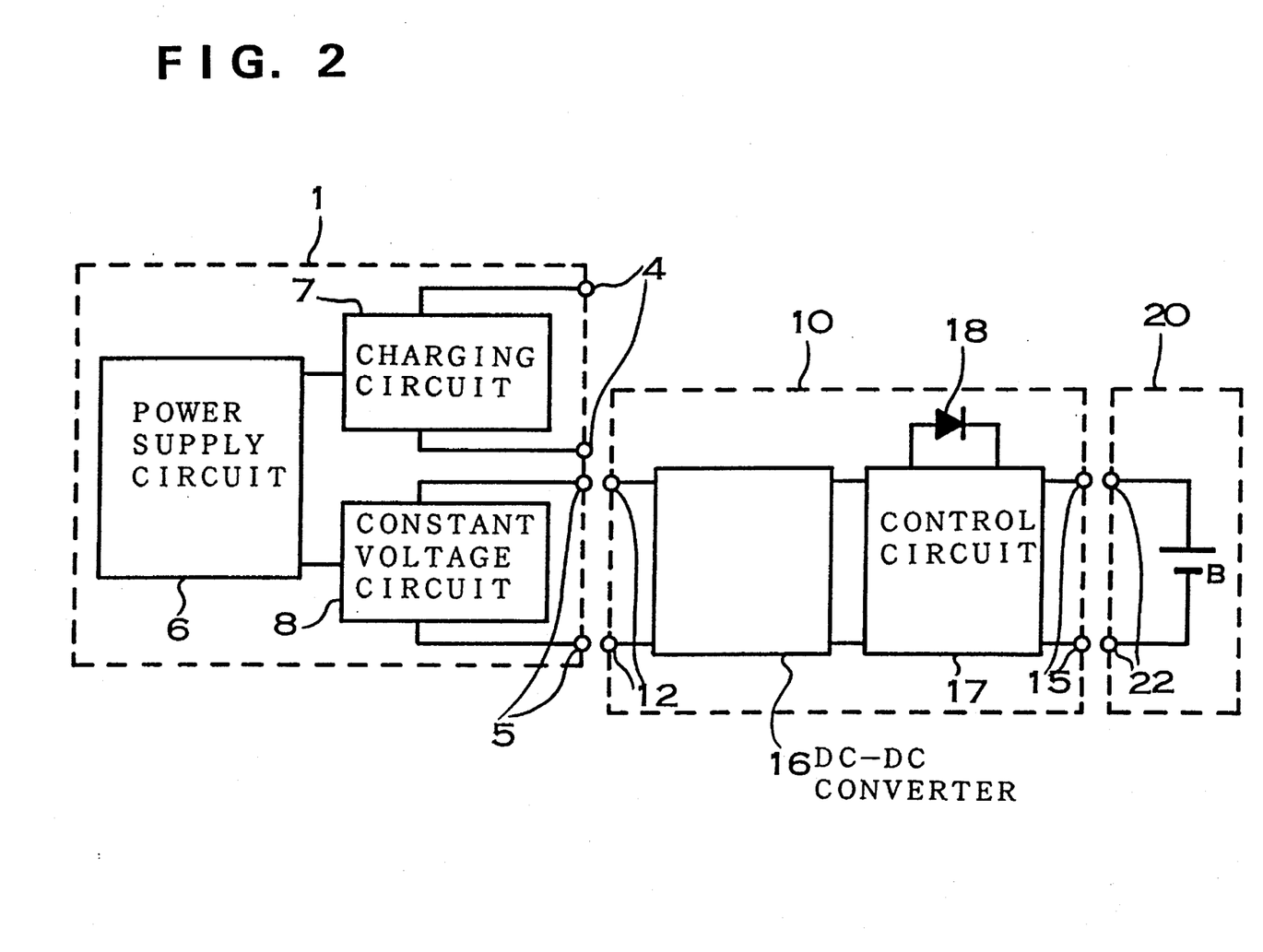
FIG. 2 is a circuit diagram of an embodiment of the present invention.

FIGS. 1 and 2 show the first embodiment of this invention. The battery charger 1 of these and other figures contains a power supply circuit 6 and a charging control circuit. The charging control circuit comprises a charging circuit 7 that outputs a constant current and a constant voltage circuit 8 that outputs a constant voltage. The power supply circuit 6 is made up of components such as a noise suppressing circuit, a rectifying circuit, and an inverter circuit. The battery charger 1 has a battery mount 2 on its top surface for mounting an alkali rechargeable battery pack containing constant current rechargeable alkali batteries (not illustrated) or an attachment 10.

The battery mount 2 is provided with a pressure piece 3 on its bottom surface to resiliently exert pressure on the mounted alkali rechargeable battery pack (not illustrated). The bottom surface of the battery mount 2 is also provided with charging terminals 4 that electrically connect with the internal charging circuit 7 to output a constant current, and adapter terminals 5 that electrically connect with the internal constant voltage circuit 8 to output a constant voltage.

The bottom of the attachment 10 is shaped into a connecting section 19 that can fit on the battery mount 2 of the battery charger 1. Connecting terminals 12 are provided on the connecting section 19 to join with the adapter terminals 5 of the battery charger 1. The top of the attachment 10 is provided with a battery mount 11 for mounting a battery pack 20 containing constant voltage rechargeable battery cells B (for example, nonaqueous rechargeable batteries). Projections 13 are formed on both side-walls of the battery mount 11 to mate with the insertion grooves 21 of the battery pack 20. The battery mount 11 is also provided with a pressure piece 14 near the center of its bottom surface to resiliently exert pressure on the battery pack 20, and with charging contacts 15 on its interior wall to connect with the terminals 22 of the battery pack 20 and output a prescribed constant voltage.

The attachment 10 shown in FIG. 1 has a connecting section 19 shaped in a manner allowing it to be freely attached to, and detached from the battery mount 2 of the battery charger 1. An attachment 10 with this configuration has the feature that it is easily connected to the battery charger 1. However, the attachment of this invention is not restricted to a shape that allows direct connection to the charger's battery mount. This is because the attachment can electrically connect to the adapter terminals of the battery charger to charge the battery pack without being attachable and detachable to the battery charger. Consequently, the attachment can be of an entirely independent shape from the battery charger. It is adequate for the attachment configuration to allow a battery pack to be mounted on it and to allow electrical connection to the adapter terminals of the battery charger.

Further, the attachment 10 shown in FIG. 2 contains a DC-DC converter 16 and a control circuit 17. The DC-DC converter 16 converts the constant voltage level, that is output from the adapter terminals 5 of the battery charger 1 and input through the attachment's connecting terminals 12, to a constant voltage level suitable for the battery cells contained in the battery pack 20. The control circuit 17 outputs the DC-DC converter output through the charging contacts 15 and controls battery pack 20 charging as well. The control circuit 17 also connects with a status display means LED 18 to indicate that the battery pack 20 is being charged or is fully charged.

The battery pack 20 shown in FIG. 2 contains nonaqueous rechargeable battery cells B such as lithium ion batteries that are charged by a constant voltage. Although the battery pack in FIG. 2 shows only a single cell, battery packs almost without exception contain a plurality of cells. Both ends of the battery cell B form the battery terminals 22. Further, the battery pack 20 containing nonaqueous rechargeable batteries has a smaller package than battery packs containing constant current rechargeable batteries such as alkali batteries (not illustrated).

The apparatus shown in FIGS. 1 and 2 charge a battery pack by connecting the attachment's connecting terminals 12 to the battery charger's adapter terminals 5. When connected in this manner, the attachment's DC-DC converter 16 converts the output of the constant voltage circuit 8, which is output through the adapter terminals 5, to a prescribed constant voltage output. The DC-DC converter 16 output is delivered to the charging contacts 15 via the control circuit 17. Therefore, when a battery pack 20 is mounted on the attachment 10, a prescribed constant voltage is applied across the battery cell B inside the battery pack 20, and a constant voltage charging of cell B begins. At this time the LED 18 indicates charging in progress by lighting.

When the cell B inside the battery pack 20 becomes fully charged, the battery pack 20 charging current becomes essentially zero. The control circuit 17 detects a full charge by measuring the charging current. When the battery cell B becomes fully charged, the control circuit 17 blinks the LED 18 indicating a full charge and terminates charging.

On the other hand, constant current rechargeable battery packs such as alkali rechargeable battery packs mount directly on the battery mount 2 of the battery charger 1 without intervention of the attachment 10. In this case, the battery pack connects with the the charging circuit 7 via the charging terminals 4, and and is charged by constant current output from the charging terminals 4.

Figure 3:
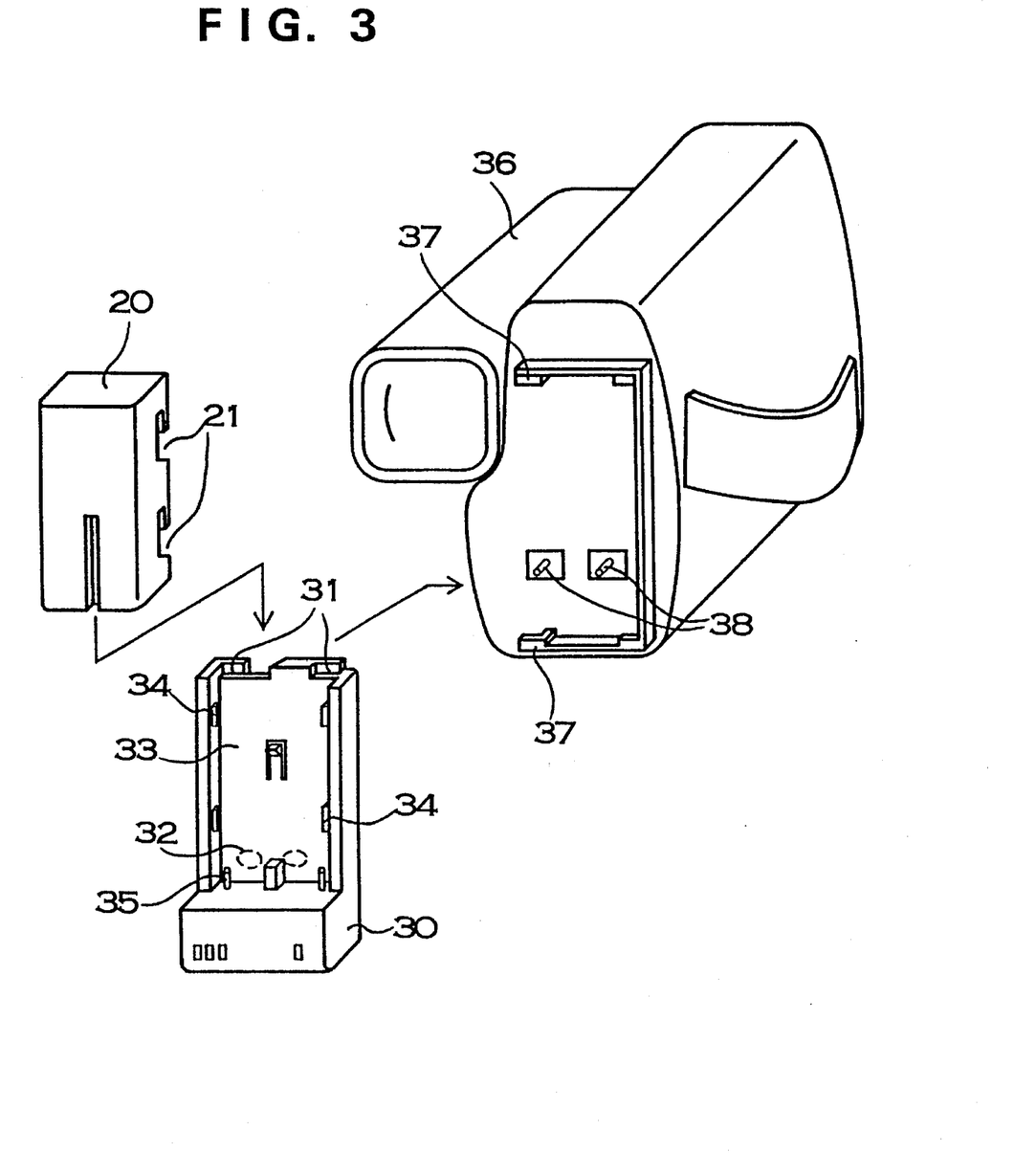
FIG. 3 is an oblique view showing the battery of an embodiment of the present invention mounted on a piece of electrical equipment.

FIG. 3 is an example of the first embodiment in which a battery charging attachment is used to mount a charged battery pack 20 on electrical equipment (for example, a video camera) designed for alkali rechargeable battery pack specifications. The power source attachment 30 for mounting a battery pack on electrical equipment has insertion grooves 31 formed on its upper and lower ends to mate with projections 37 on the electrical equipment 36. It is also provided with output terminals 32 on its back side to connect with the power terminals 38 of the electrical equipment 36.

Further, the power source attachment 30 is provided with a battery mount 33 for mounting the battery pack 20 on its front side. The battery mount 33 is provided with projections 34 on both side-walls to mate with the insertion grooves 21 of the battery pack 20. The interior wall of the battery mount 33 is provided with contacts 35 to electrically connect with the terminals 22 (refer to FIG. 2) of the battery pack 20. These contacts 35 are electrically connected with the output terminals 32.

The attachment 30 can also be provided with a circuit to measure and display the remaining battery capacity of the battery pack 20.

With this configuration, a battery pack 20 charged according to the first embodiment shown in FIG. 1 can be mounted on the electrical equipment 36 and used as its power source via mounting on the attachment 30. As shown by the arrows in FIG. 3, the direction of mounting the battery pack 20 on the attachment 30 is at right angles to the direction of mounting the attachment 30 on the electrical equipment 36. Further, the thickness of the attachment's battery mount 33 is less than the height of the projections 37 on the electrical equipment. Consequently, the battery pack 20 mounted on the attachment 30 in turn mounted on the electrical equipment 36 is held in place by the projections 37 on the electrical equipment 36 and cannot easily fall off the attachment 30.

Figure 4:
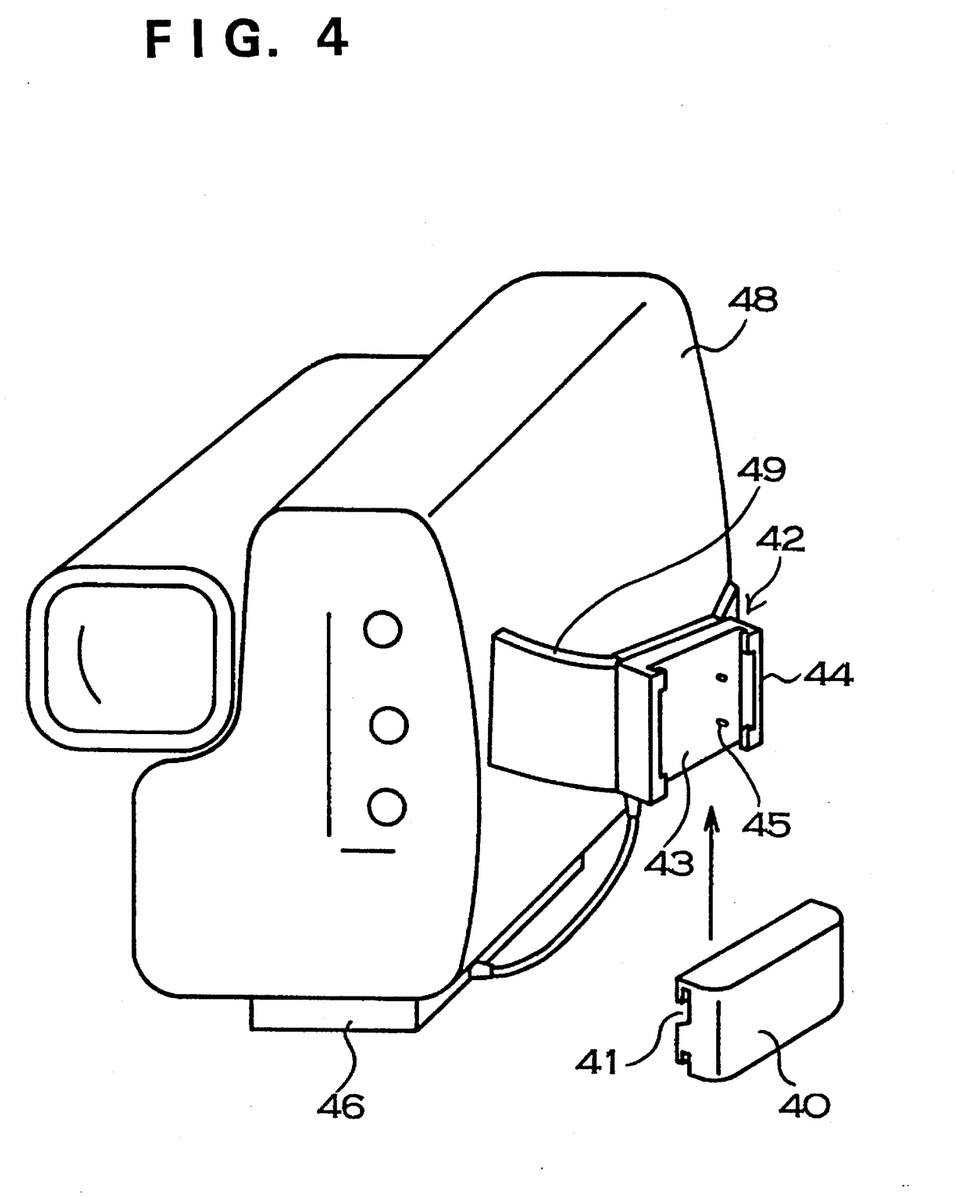
FIG. 4 is an oblique view showing the battery of an embodiment of the present invention mounted on a piece of electrical equipment.
Figure 5:
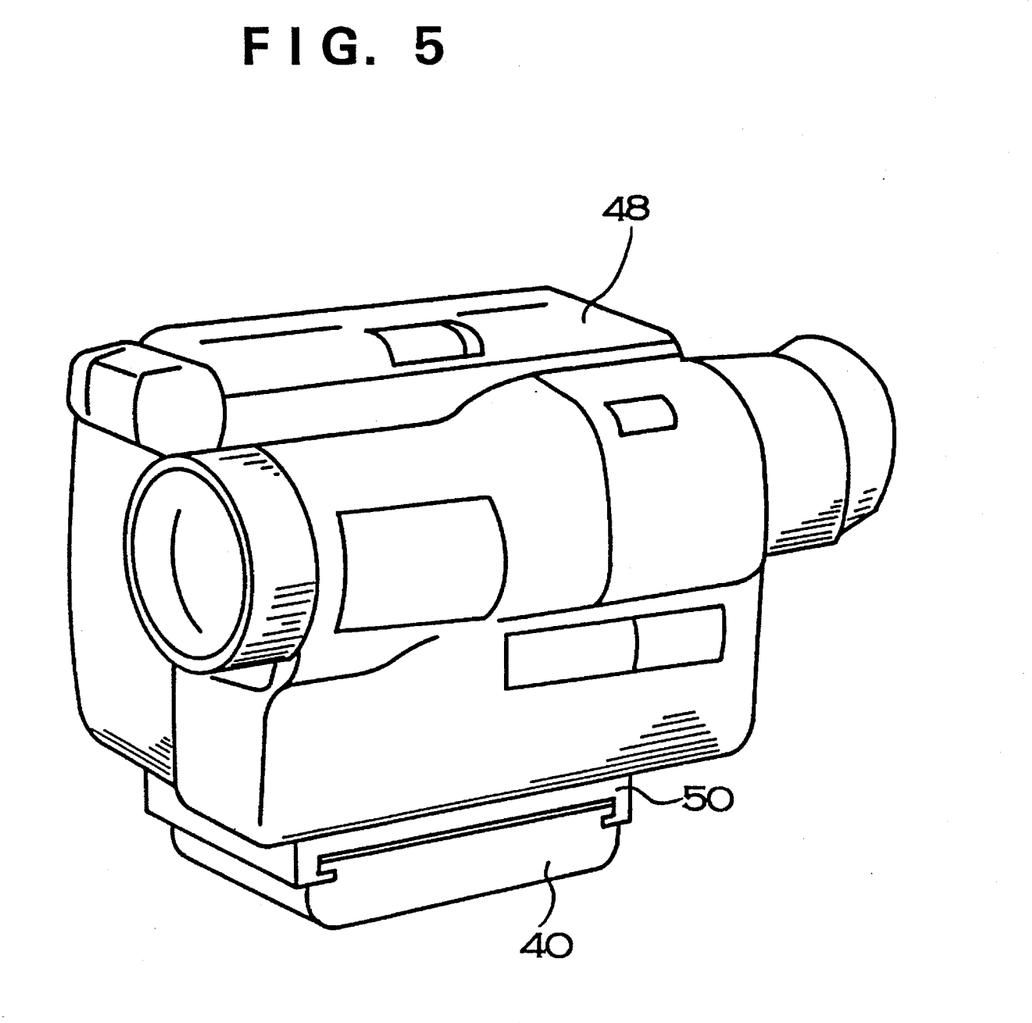
FIG. 5 is an oblique view showing the battery of an embodiment of the present invention mounted on a piece of electrical equipment.

FIGS. 4 and 5 show an embodiment where a battery pack 40 charged without use of the attachment 10 of the first embodiment (refer to FIGS. 1 and 2), in other words an alkali rechargeable battery pack, is mounted on electrical equipment 48 (for example, a video camera) designed for nonaqueous rechargeable battery pack specifications.

First in FIG. 4, the face of the power source attachment 42 is a battery mount 43 for mounting the battery pack 40, and both sides of the mount 43 are provided with projections 44 that mate with the insertion grooves 41 of the battery pack 40. The battery mount 43 is also provided with contacts 45 to electrically connect with the terminals of the battery pack 40.

The reverse side of this attachment 42 is shaped in a fashion allowing it to clip onto the camera grip 49 of the electrical equipment 48.

Further, the attachment 42 is provided with an input section 46 that electrically connects with adapter input terminals (not illustrated) on the bottom of the electrical equipment to supply power from the battery pack 40 to the electrical equipment.

Next, the attachment 50 in FIG. 5 combines the attachment 42 and input section 46 of FIG. 4 into a single unit. The attachment 50 and the battery pack 40 are mounted in a piggy-back fashion on the bottom of the electrical equipment 48.

Figure 6:
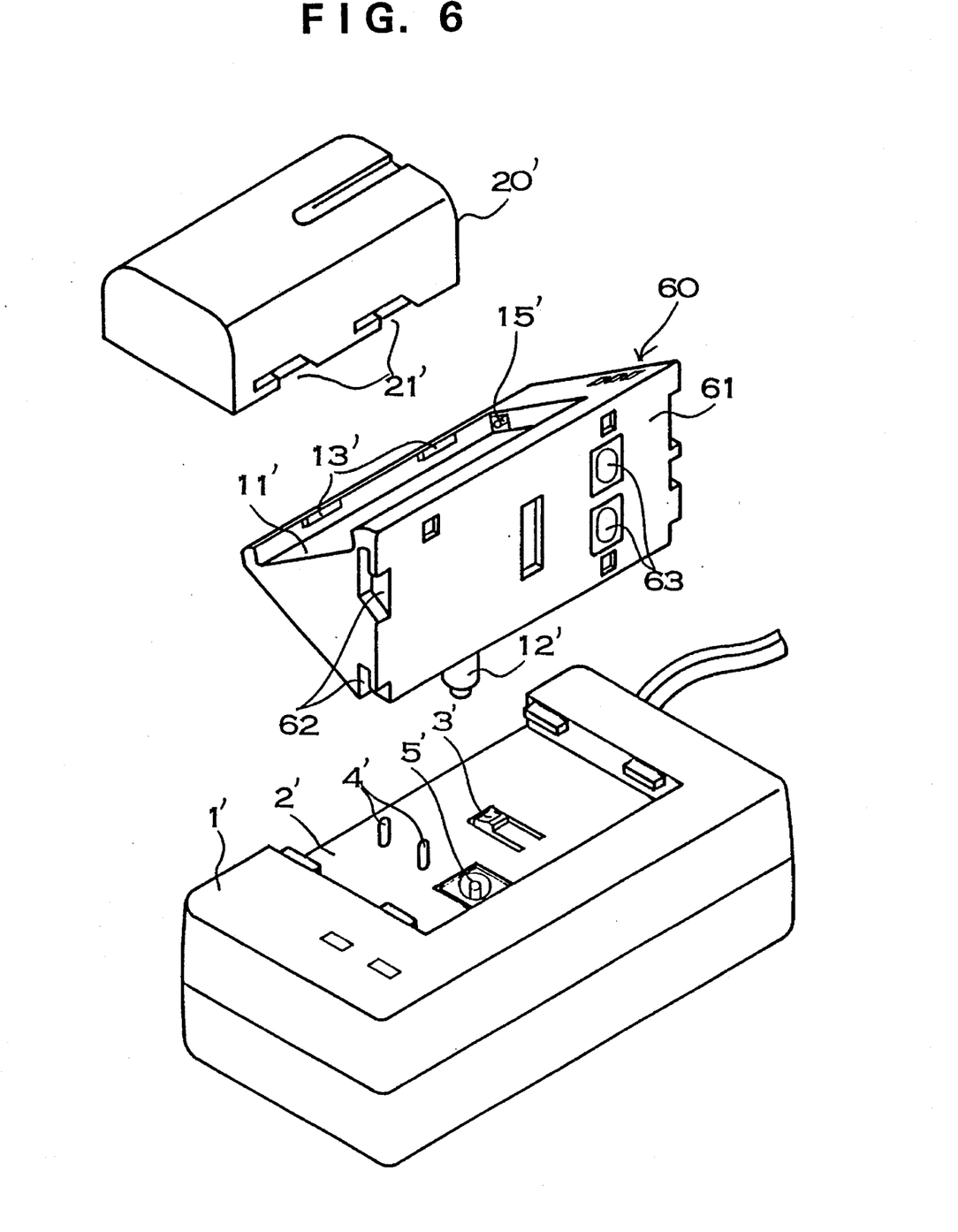
FIG. 6 is an oblique view showing another embodiment of the present invention.
Figure 7:
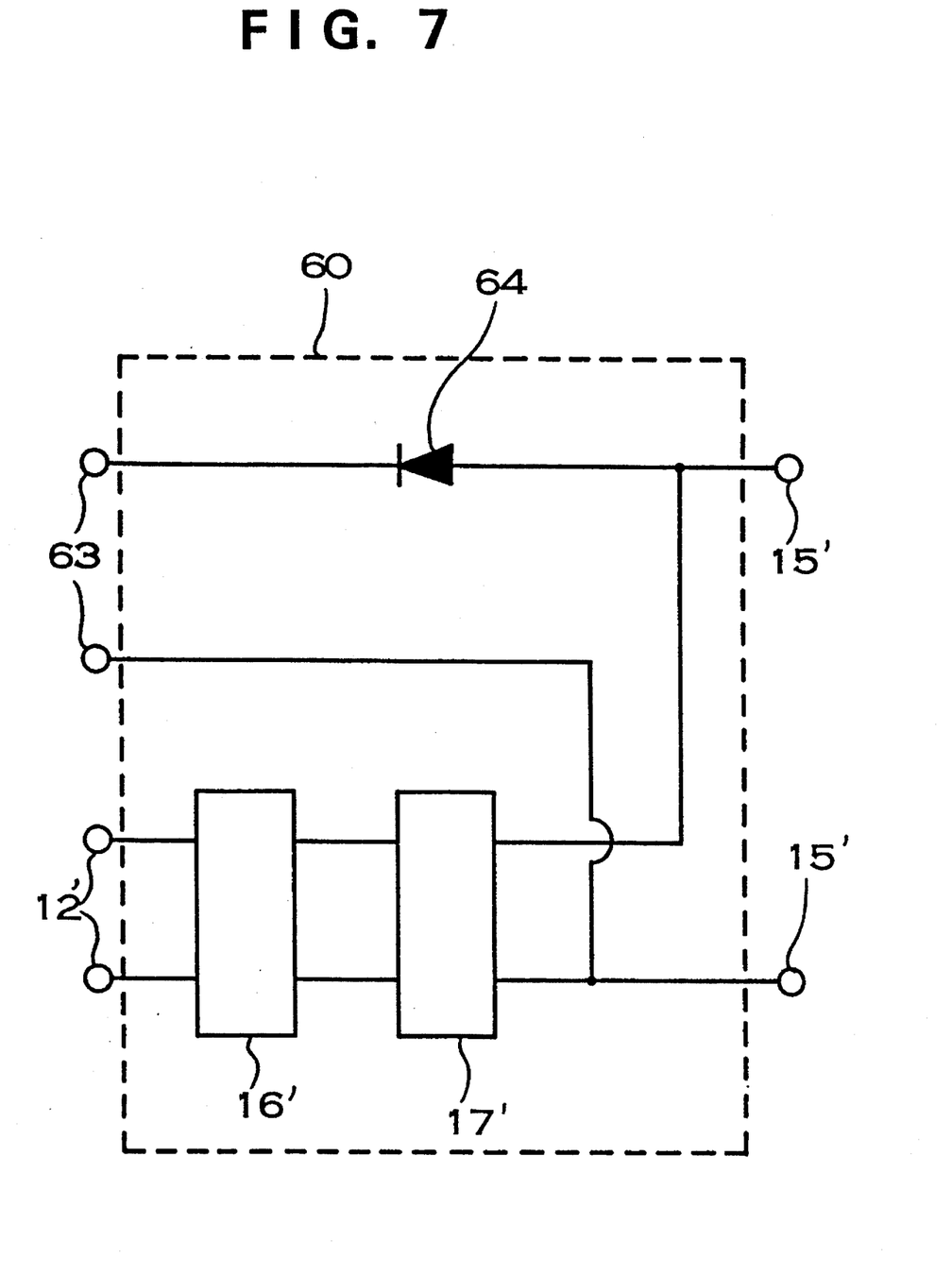
FIG. 7 is a circuit diagram of another embodiment of the present invention.

FIGS. 6 and 7 illustrate other embodiments of the present invention. The apparatus of these embodiments have different shaped attachments than those of the first embodiment. Here the explanation will be abbreviated by inclusion of a (') mark after part numbers that are the same as those in FIGS. 1 and 2.

The attachment 60 in this embodiment is shaped as a triangular column and has a mounting surface 61 to allow mounting on electrical equipment 36 shown in FIG. 3 (namely, electrical equipment designed for alkali rechargeable battery packs). The mounting surface 61 is provided with insertion grooves 62 that mate with projections 37 on the electrical equipment 36 (see FIG. 3), and with output terminals 63 that connect with the power terminals 38 of the electrical equipment 36 (see FIG. 3).

As shown in FIG. 7, the output terminals 63 are connected with the charging contacts 15' in parallel to the connecting terminals 12'. A diode 64 is connected between the output terminals 63 and the charging contacts 15' in a manner that allows current to flow only from the charging contacts 15 to the output terminals 63. Consequently, even if the mounting surface 61 of the attachment 60 is mounted on the battery mount 2' of the battery charger 1', charging current cannot flow from the output terminals 63 to the charging contacts 15' and the battery pack 20' cannot be mistakenly charged to constant current.

In this embodiment, by using the dual purpose charging and power source attachment 60, the battery pack 20' can be charged by the battery charger 1' and can be mounted on electrical equipment 36 using the same attachment 60.

Figure 8:
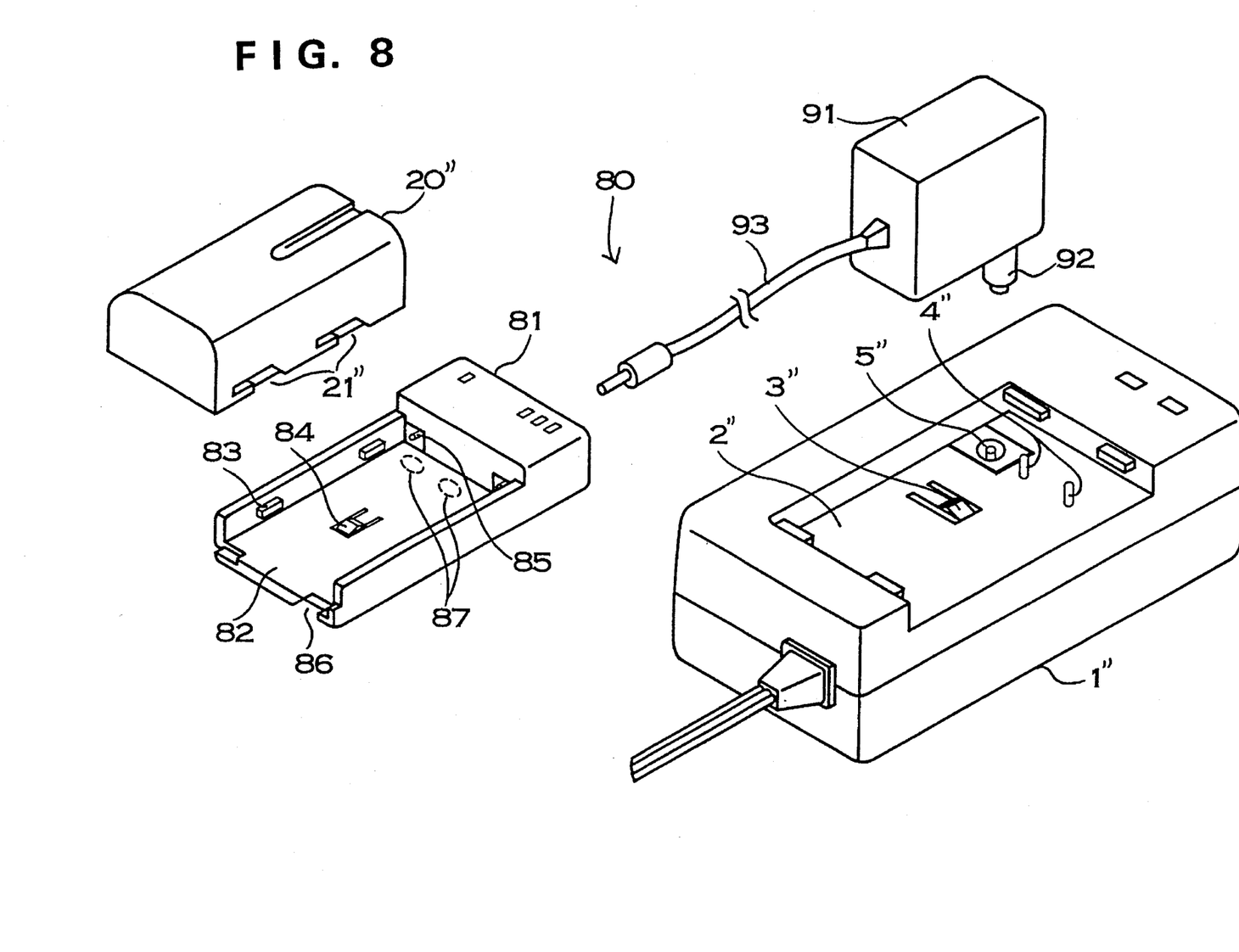
FIG. 8 is an oblique view showing yet another embodiment of the present invention.
Figure 9:
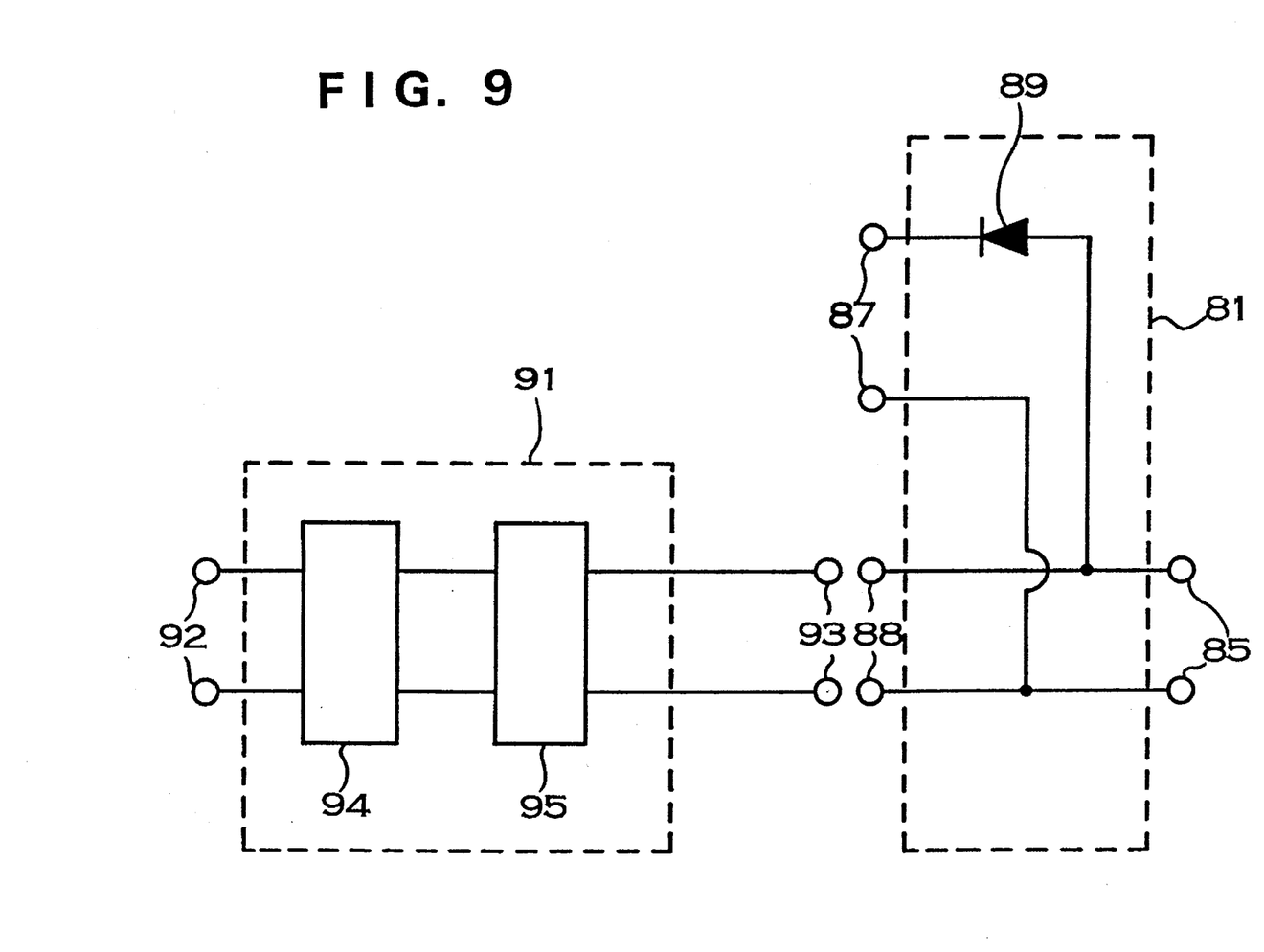
FIG. 9 is a circuit diagram of yet another embodiment of the present invention.

FIGS. 8 and 9 show still another embodiment of the present invention. The attachment 80 of this embodiment comprises an attachment body 81 and an electrical converter 91. In these figures, the explanation will be abbreviated by inclusion of a (") mark after part numbers that are the same as those in FIGS. 1 and 2.

With the exception of the connecting terminals 88, the attachment body 81 discussed below has the same structure as the power source attachment 30 shown in FIG. 3. Namely, the upper surface of the attachment body 81 is provided with a battery mount 82 for mounting the battery pack 20", and projections 83 are provided on both side-walls of the battery mount 82 to mate with the insertion grooves 21" of the battery pack 20". The battery mount 82 is also provided with a pressure piece 84 near its center to resiliently exert pressure on the battery pack 20". The interior wall of the battery mount 82 is provided with charging contacts 85 to connect with the terminals of the battery pack 20".

The bottom surface of the attachment body 81 forms a coupling section for mounting on electrical equipment 36 (see FIG. 3) built for alkali rechargeable battery packs. The coupling section is provided with insertion grooves 86 to mate with battery mount projections 37 on the electrical equipment 36 (see FIG. 3). The direction of these insertion grooves 86 is at right angles to the projections 83 on the attachment body battery mount 82. The coupling section is also provided with output terminals 87 to electrically connect with the power terminals 38 of the electrical equipment 36.

Further as shown in FIG. 9, the attachment body 81 has connecting terminals 88 for electrical connection to the converter 91. These connecting terminals 88 are arranged in parallel with the output terminals 87, and a diode 89 is connected between the output terminals 87 and the charging contacts 85 to allow current flow only from the charging contacts 85 to the output terminals 87. Consequently, even if the attachment 80 is mounted on the battery mount 2" of the battery charger 1", the battery pack 20" will not be charged.

The attachment body 81 can also be provided with a circuit to measure and display the remaining battery capacity of the battery pack 20".

The electrical converter 91 is provided with connecting terminals 92 to connect with the adapter terminals 5" of the battery charger 1", and a connecting cord 93 with a connecting plug to electrically join to the connecting terminals 88 of the attachment body 81 (see FIG. 9). The electrical converter 91 contains a DC-DC converter 94 to convert a constant voltage input from the connecting terminals 92 to a prescribed constant voltage. The electrical converter 91 also contains a charging circuit 95 to supply a converted constant voltage output to the charging contacts 85 of the attachment body 81 over the connecting cord 93. The charging circuit 95 also controls charging of the battery pack 20".

With this configuration and with the electrical converter 91 and the attachment body 81 electrically joined and the connecting terminals 92 of the converter 91 connected to the adapter terminals 5" of the battery charger 1", the DC-DC converter 94 of the electrical converter 91 converts the constant voltage output from the adapter terminals 5" to a prescribed constant voltage and inputs it to the charging circuit 95. The charging circuit 95 outputs the converted constant voltage to the attachment body 81 via the connecting cord 93. The attachment body 81 outputs charging power from its charging contacts 85. Consequently, when the battery pack 20" is mounted on the attachment body 81, a prescribed constant voltage is applied to the internal cells of the battery pack 20" to perform constant voltage charging.

The battery pack 20" charged in this way and mounted on the attachment body 81 can serve as power source by mounting the unit on the electrical equipment 36 in a fashion similar to that shown in FIG. 3.

Apparatus with the above configuration can charge a battery pack by a charging method suitable to that type of battery pack using a single battery charger having both charging terminals with constant current output and adapter terminals with constant voltage output. Specifically, alkali rechargeable battery packs requiring a constant current charging and nonaqueous rechargeable battery packs requiring a constant voltage charging can be charged as needed by a single battery charger.

Further, various battery packs with different shapes can also be used as power sources for electrical equipment.

What is claimed is:

1. An attachment for mating a battery pack which houses battery cells charged by a constant voltage charging, with a battery charger, comprising:

charging terminals for a constant current output and adapter terminals at constant voltage output;

a battery mount for freely mounting or removing the battery pack;

connecting terminals for electrical connection with said adapter terminals; and charging contacts for electrical connection with battery terminals of the battery pack mounted in said battery mount and with electrical connection to said connecting terminals.

2. An attachment as recited in claim 1, further comprising a coupling section for freely connecting and removing the attachment to or from electrical equipment.

3. An attachment as recited in claim 2, further comprising output terminals to deliver battery pack output to electrical equipment when the coupling section is connected with the electrical equipment.

4. An attachment as recited in claim 1, further comprising a connecting section for freely connecting and removing the attachment to or from the battery charger.

5. An attachment as recited in claim 4, further comprising connecting terminals to connect with the battery charger adapter terminals when the connecting section is on the battery charger.

6. An attachment as recited in claim 1, further comprising:

(a) an attachment body provided with a battery mount for freely mounting and removing the battery pack; and (b) an electrical connector to join the attachment body with the battery charger.

7. An attachment as recited in claim 1, further comprising:

(a) a connecting section for free connection and removal to or from the battery charger; and (b) a coupling section for free connection and removal to or from electrical equipment.

8. An attachment as recited in claim 1, further comprising:

(a) connecting terminals for the connecting section; and (b) output terminals for the coupling section.

9. A battery charging apparatus comprising:

an attachment for mating a first battery pack which houses battery cells charged by a constant voltage charging with a battery charger provided with charging terminals for a constant current output and adapter terminals for a constant voltage output;

wherein said battery charger comprises a mounting section for direct connection of a second battery pack, which houses battery cells charged by a constant current charging, and said mounting section electrically connects said charging terminals with battery terminals of said second battery pack mounted in said mounting section; and said attachment comprising: a battery mounted for freely mounting or removing the first battery pack; connecting terminals for electrical connection with said adapter terminals; and charging contacts for electrical connection with battery terminals of the first battery pack mounted in said battery mount and with electrical connection to said connecting terminals.

10. A battery charging apparatus as recited in claim 9, wherein the battery charger is provided with a mount for freely mounting and removing the attachment.

11. A battery charging apparatus as recited in claim 10, wherein the battery charger is provided with adapter terminals in the mount.

12. A battery charging apparatus as recited in claim 9, wherein the attachment is provided with a coupling section for freely connecting and removing it to or from electrical equipment.

13. A battery charging apparatus as recited in claim 12, wherein the attachment is provided with output terminals to deliver battery pack output to electrical equipment when the coupling section is connected with the electrical equipment.

14. A battery charging apparatus as recited in claim 10, wherein the attachment is provided with a connecting section for freely connecting and removing the attachment to or from the mount of the battery charger.

15. A battery charging apparatus as recited in claim 14, wherein the attachment is provided with connecting terminals to connect with the battery charger adapter terminals when the connecting section is on the mount of the battery charger.

16. A battery charging apparatus as recited in claim 9, wherein the attachment comprises:

(a) an attachment body provided with a battery mount for freely mounting and removing the battery pack; and (b) an electrical connector to join the attachment body with the battery charger.

17. A battery charging apparatus as recited in claim 9, wherein the attachment comprises:

(a) a connecting section for free connection and removal to or from the battery charger; and (b) a coupling section for free connection and removal to or from electrical equipment.

18. A battery charging apparatus as recited in claim 17, wherein the attachment comprises:

(a) connecting terminals for the connecting section; and (b) output terminals for the coupling section.

* * * * *